US012716654B2

(12) United States Patent
Bassett et al.

(10) Patent No.: US 12,716,654 B2
(45) Date of Patent: Aug. 25, 2026

(54) FLOW STABILITY CONTROL IN DRYING LIQUID BETWEEN PLATES

(71) Applicant: Tokyo Electron Limited, Tokyo (JP)

(72) Inventors: Derek Bassett, Austin, TX (US); Rencheng Dong, Austin, TX (US)

(73) Assignee: Tokyo Electron Limited, Tokyo (JP)

( * ) Notice: Subject to any disclaimer, the term of this patent is extended or adjusted under 35 U.S.C. 154(b) by 558 days.

(21) Appl. No.: 18/455,314

(22) Filed: Aug. 24, 2023

(65) Prior Publication Data

US 2025/0085053 A1 Mar. 13, 2025

(51) Int. Cl.
*F26B 21/37* (2026.01)
*B08B 3/02* (2006.01)

(52) U.S. Cl.
CPC ................ *F26B 21/37* (2026.01); *B08B 3/02* (2013.01); *B08B 2203/00* (2013.01)

(58) Field of Classification Search
CPC ........ F26B 21/37; B08B 3/02; B08B 2203/00
See application file for complete search history.

(56) References Cited

U.S. PATENT DOCUMENTS 7,000,653 B2 * 2/2006 Sakashita ............ H10P 72/0402 141/69
7,264,008 B2 9/2007 Kim et al.
11,833,550 B2 12/2023 Inukai et al.
2018/0226245 A1 * 8/2018 Sakane ............. H01J 37/32348
2024/0058847 A1 2/2024 Inukai et al.
2025/0085053 A1 * 3/2025 Bassett ..................... B08B 3/02

FOREIGN PATENT DOCUMENTS

JP 2012-142617 A 7/2012
KR 10-2008-0072245 A 8/2008
KR 10-2015-0121472 A 10/2015

OTHER PUBLICATIONS

International Search Report and Written Opinion issued Nov. 20, 2024 in PCT/US2024/040640, 9 pgs.

* cited by examiner

*Primary Examiner* — Sharidan Carrillo
(74) *Attorney, Agent, or Firm* — Oblon, McClelland, Maier & Neustadt, L.L.P.

(57) ABSTRACT

A method of flow control is provided. The method includes injecting a liquid onto a wafer via a dispense system. The dispense system includes a plate and an injection hole in the plate. The plate is positioned away from the wafer at a distance and has a diameter equal to or larger than the wafer. A drying gas is injected onto the wafer via the dispense system to push out the liquid. While injecting the drying gas onto the wafer via the dispense system, at least one parameter selected from the group consisting of an inlet flow pressure of the injection hole, the distance and an injection sequence is adjusted so that an interface between the drying gas and the liquid is stable.

18 Claims, 7 Drawing Sheets

FLOW STABILITY CONTROL IN DRYING LIQUID BETWEEN PLATES

INCORPORATION BY REFERENCE

Aspects of the present disclosure are related to Applicant's co-pending U.S. patent application Ser. No. 18/192,279, filed Mar. 29, 2023, now U.S. Pat. No. 12,103,052, titled "Method and Single Wafer Processing System for Processing of Semiconductor Wafers", which is incorporated herein by reference in its entirety and claims benefit to U.S. Provisional Application No. 63/351,922 filed Jun. 14, 2022, titled "Method and Single Wafer Processing System for Processing of Semiconductor Wafers".

FIELD OF THE INVENTION

This disclosure relates to flow control and semiconductor processing.

BACKGROUND

In the manufacture of a semiconductor device (especially on the microscopic scale), various fabrication processes are executed such as film-forming depositions, etch mask creation, patterning, material etching and removal, doping treatments, etc. These processes are performed repeatedly to form desired semiconductor device elements on a substrate. Critical to all these processes is wafer cleaning and drying as a clean and dry wafer is the prerequisite of virtually all semiconductor processing.

SUMMARY

The present disclosure relates to a method of flow control.

According to some aspects of the disclosure, a method of flow control is provided. The method includes injecting a liquid onto a wafer via a dispense system. The dispense system includes a plate and an injection hole in the plate. The plate is positioned away from the wafer at a distance and has a diameter equal to or larger than the wafer. A drying gas is injected onto the wafer via the dispense system to push out the liquid. While injecting the drying gas onto the wafer via the dispense system, at least one parameter selected from the group consisting of an inlet flow pressure of the injection hole, the distance and an injection sequence is adjusted so that an interface between the drying gas and the liquid is stable.

In some embodiments, while injecting the drying gas onto the wafer via the dispense system, the distance is kept constant, and the inlet flow pressure is adjusted.

In some embodiments, the inlet flow pressure is adjusted based on a position of the interface.

In some embodiments, the inlet flow pressure is adjusted based on equations $$p_{in}(r) = \frac{12rU}{h^2}\left(\mu_1 \ln\left(\frac{r}{R_{in}}\right) + \mu_2 \ln\left(\frac{R_{out}}{r}\right)\right) + \frac{\gamma}{h},$$

$$\text{and } u = \left(\frac{3h\omega(\mu_2+\mu_1)}{4}\right)^{2/3} \frac{\gamma^{1/3}}{\mu_2-\mu_1}.$$

$p_{in}(r)$ is the inlet flow pressure. r is an average radius of the interface. u is an average velocity of the interface. h is the distance. $\mu_1$ is a viscosity of the drying gas. $\mu_2$ is a viscosity of the liquid. $R_{in}$ is a radius of an inlet of the injection hole. $R_{out}$ is a radius of the wafer. $\gamma$ is a surface tension of the liquid. $\omega$ is an instability growth rate.

In some embodiments, while injecting the drying gas onto the wafer via the dispense system, the inlet flow pressure is kept constant, and the distance is adjusted.

In some embodiments, the inlet flow pressure is adjusted based on a position of the interface.

In some embodiments, the inlet flow pressure is adjusted based on equations;

$$p_{in}h^2 - \gamma h - 12ru\left(\mu_1 \ln\left(\frac{r}{R_{in}}\right) + \mu_2 \ln\left(\frac{R_{out}}{r}\right)\right) = 0,$$

$$\text{and } u = \left(\frac{3h\omega(\mu_2+\mu_1)}{4}\right)^{2/3} \frac{\gamma^{1/3}}{\mu_2-\mu_1}.$$

$p_{in}(r)$ is the inlet flow pressure. r is an average radius of the interface. u is an average velocity of the interface. h is the distance. $\mu_1$ is a viscosity of the drying gas. $\mu_2$ is a viscosity of the liquid. $R_{in}$ is a radius of an inlet of the injection hole. $R_{out}$ is a radius of the wafer. $\gamma$ is a surface tension of the liquid. $\omega$ is an instability growth rate.

In some embodiments, the dispense system includes a plate and a plurality of injection holes. The plurality of injection holes includes a central injection hole, a first radial row of injection holes around the central injection hole, and a second radial row of injection holes around the first radial row of injection holes.

In some embodiments, while injecting the drying gas onto the wafer via the dispense system, the injection sequence is adjusted by injecting the drying gas onto the wafer via the central injection hole. After the interface moves past the first radial row, the drying gas is adjusted via the first radial row of injection holes. After the interface moves past the second radial row, the drying gas is adjusted via the second radial row of injection holes.

In some embodiments, while adjusting the injection sequence, at least one of the distance or the inlet flow pressure is adjusted.

In some embodiments, the central injection hole, the first radial row and the second radial row are concentric.

In some embodiments, while injecting the drying gas onto the wafer via the dispense system, the distance and the inlet flow pressure are adjusted simultaneously or sequentially.

In some embodiments, the interface is moving at a substantially constant velocity.

In some embodiments, the interface is substantially circular.

In some embodiments, the drying gas includes air.

In some embodiments, the liquid includes isopropyl alcohol.

In some embodiments, the injection hole is in a center of the plate, and the plate has the diameter equal to the wafer.

In some embodiments, the plate is substantially flat or conical.

In some embodiments, the drying gas is injected onto the wafer via the dispense system from one or two sides of the wafer.

In some embodiments, the wafer is kept from rotating while injecting the drying gas onto the wafer.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION

Figure 1A:
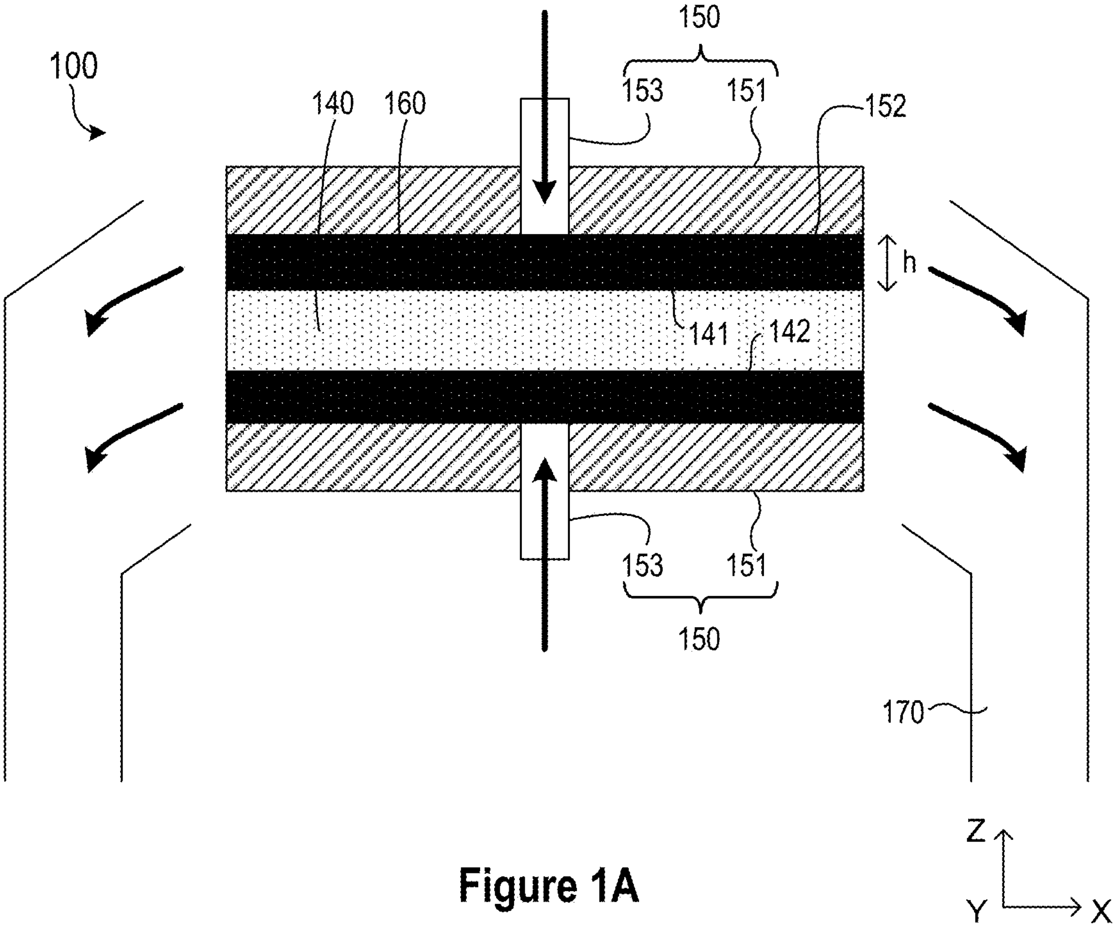
FIG. 1A shows a vertical cross-sectional view of a wafer cleaning system, in accordance with one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity's sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

In the drawings, like reference numerals designate identical or corresponding parts throughout the several views. Additionally, as used herein, the words "a", "an" and the like generally carry a meaning of "one or more", unless stated otherwise.

Furthermore, the terms, "approximately", "approximate", "about" and similar terms generally refer to ranges that include the identified value within a margin of 20%, 10%, or preferably 5%, and any values therebetween.

In wafer cleaning and drying, one or more solvents are typically used to remove material (e.g. a photoresist, an etchant, a contaminant, etc.) from a wafer surface. Such solvents usually include organic solvents such as isopropyl alcohol (IPA) and/or deionized water (DI water). At the end of cleaning, a drying gas such as air is usually used to remove the solvent(s) from the wafer surface and thus dry the wafer surface.

A conventional wafer cleaning chamber needs certain space above the wafer to have adequate flow to minimize defects onto wafer and a space under wafer for installing a motor. Defects include, but are not limited to, air bubbles and finger formation caused by flow instability. These defects can lead to incomplete drying and solvent residuals on the wafer surface, thus affecting subsequent processing.

Figure 2A:
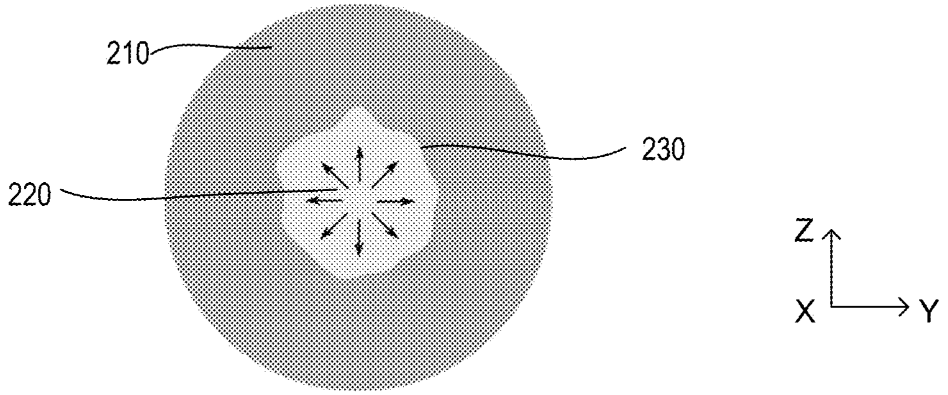
FIGS. 2A, 2B and 2C show top-down views of various stages of a wafer during drying.
Figure 2B:
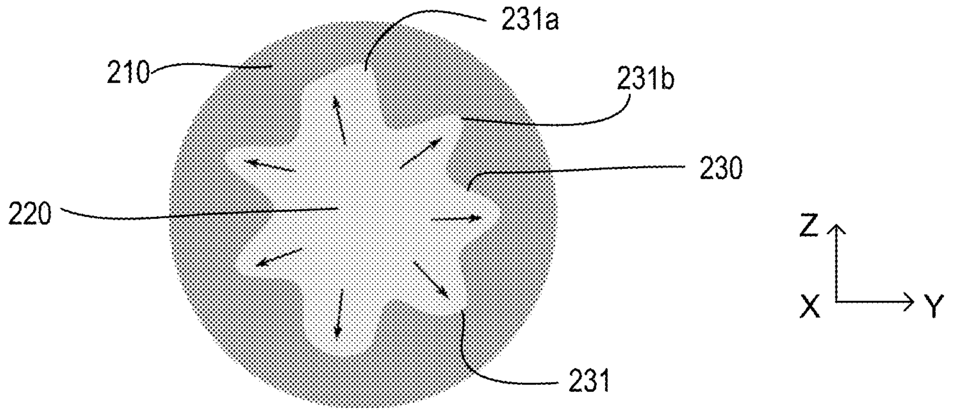
Figure 2C:
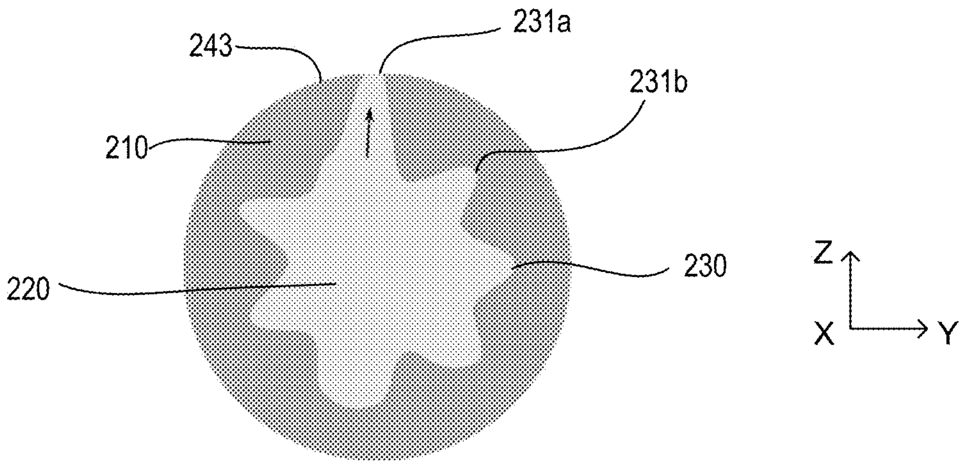

FIGS. 2A, 2B and 2C show top-down views of various stages of a wafer during drying in a wafer plate sandwich flow as disclosed in Applicant's co-pending U.S. patent application Ser. No. 18/192,279, filed Mar. 29, 2023, titled "Method and Single Wafer Processing System for Processing of Semiconductor Wafers", which is incorporated herein by reference in its entirety. In FIG. 2A, a drying gas 220 is used to push a cleaning liquid 210 out of a wafer. An interface 230 exists between the drying gas 220 and the cleaning liquid 210. FIG. 2A can show an onset of flow instability as the interface 230 is beginning to develop non-uniformity. In FIG. 2B, flow instability aggravates, and the interface 230 is no longer uniform or substantially circular. Instability can occur where some parts of the interface 230 move faster than others, thus forming fingers 231 (e.g. 231*a* and 231*b*). If a finger breaks or reaches the edge of the wafer first, the rest of the interface 230 will stop moving and the wafer will not be dried. For example in FIG. 2C, the finger 231*a* breaks or reaches an edge 243 of the wafer. Consequently, other parts of the interface 230, such as the finger 231*b*, will stop moving towards the edge 243 of the wafer.

Techniques herein provide a method to maintain flow stability between a drying gas and a cleaning liquid and thus ensure that a wafer is dried uniformly. When injecting the drying gas onto the wafer (e.g. into a gap between the wafer and an injection plate positioned over or below the wafer), an inlet flow pressure, a distance between an injection plate and the wafer, and/or an injection sequence can be adjusted so that an interface between the drying gas and the cleaning liquid is stable. For example, such an interface can be maintained to be uniform and substantially circular and move outwards in a substantially constant velocity. Techniques herein improve the concept of functional plates and single wafer hardware as disclosed in Applicant's co-pending U.S. patent application Ser. No. 18/192,279, filed Mar. 29, 2023, titled "Method and Single Wafer Processing System for Processing of Semiconductor Wafers", which is incorporated herein by reference in its entirety. Techniques herein can improve flow stability and promote faster drying, which will make wafer processing more efficient and more profitable.

Figure 1B:
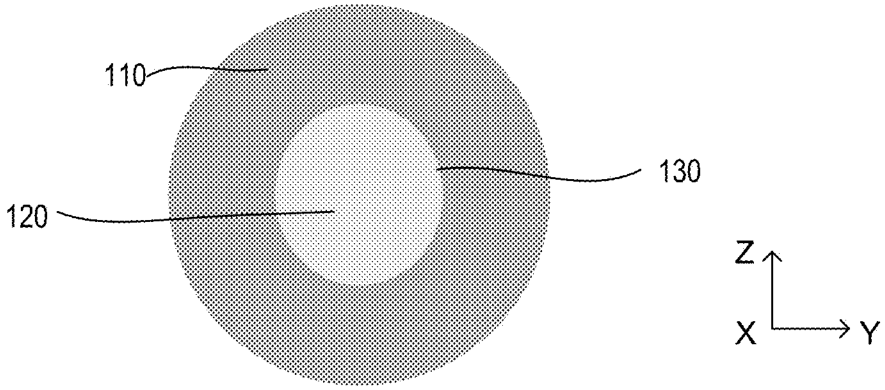
FIG. 1B shows a top-down view of a wafer during drying, in accordance with one embodiment of the present disclosure.

FIG. 1A shows a vertical cross-sectional view of a wafer cleaning system 100, and FIG. 1B shows a top-down view of a wafer during drying, in accordance with some embodiments of the present disclosure.

As shown, a dispense system 150 is positioned over a wafer 140. The dispense system 150 includes a plate 151 and a dispense nozzle 153 (also referred to as an injection hole). The plate 151 is positioned away from the wafer 140 at a distance, h to form a gap between the wafer 140 and the plate 151. A fluid 160 (e.g. a liquid or a gas) can be injected onto a first surface 141 of the wafer 140 via the dispense nozzle 153 and fill this gap between the wafer 140 and the plate 151. Arrows represent a flow direction of the fluid 160. The wafer 140 may be kept non-rotating or stationary. The distance, h is also referred to as a gap height or a channel height, and is ≤10.0 mm, preferably ≤5.0 mm, preferably ≤1.0 mm, preferably ≤0.5 mm.

During a cleaning process, a liquid 110 (or a cleaning liquid) can be injected onto the wafer 140 via the dispense nozzle 153 to clean the first surface 141. Subsequently during a drying process, a drying gas 120 (such as air) is injected onto the wafer 140 via the dispense nozzle 153 to dry the first surface 141. An interface 130 is formed between the drying gas 120 and the liquid 110 as the drying gas 120 pushed the liquid 110 out of the wafer 140. For a stable flow, the interface 130 is uniform and substantially circular.

In this example, the plate 151 has a diameter equal to that of the wafer 140. The plate is substantially flat. The dispense nozzle 153 is located in a center of the plate 151 and extends through the plate 151. Another dispense system 150 is positioned below the wafer 140 to clean and dry a second surface 142 of the wafer 140. In other examples, the plate 151 can have a diameter larger than that of the wafer 140. Only one dispense system 150 may be needed, either over or below the wafer 140. The plate 151 can be conical, shaped like a cone.

Figure 3A:
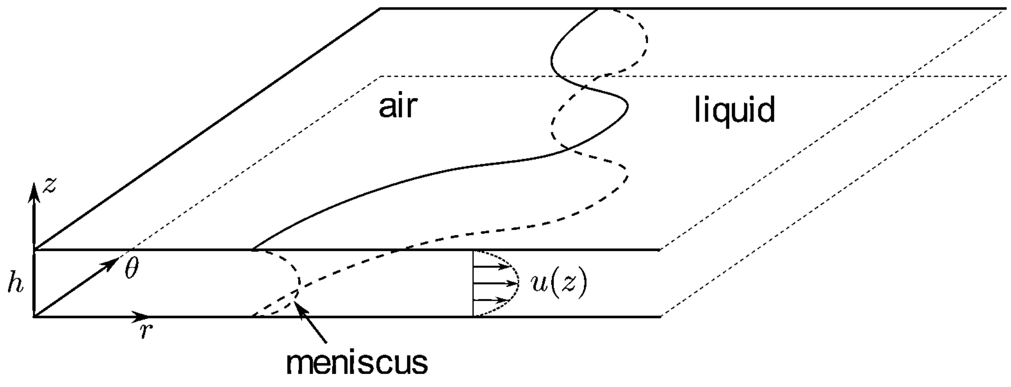
FIG. 3A shows a schematic of flow (in)stability analysis, in accordance with one embodiment of the present disclosure.

As discussed above, for an instable flow, fingers 231 can be formed in FIGS. 2B and 2C. Viscous fingering, also known as the Saffman-Taylor instability, was first characterized over 50 years ago by Saffman and Taylor. In a non-limiting example, FIG. 3A shows a schematic of flow (in)stability analysis in a Hele-Shaw cell when the drying gas is air and the liquid is isopropyl alcohol (IPA). F. Gallaire and P.-T. Brun discussed "Fluid dynamic instabilities: theory and application to pattern forming in complex media" in Philosophical Transactions of the Royal Society A: Mathematical, Physical and Engineering Sciences (vol. 375, no. 2093, p. 20160155, May 2017, publisher: Royal Society).

Following F. Gallaire and P.-T. Brun's analysis, we assume the plane front (e.g. the interface 130) is propagating at a substantially constant velocity $U_{ex}$. The base pressure field is given by $P_i=u/K_i(x-ut)$ (1), where the porosity $K_i$ is determined by Hagen-Poiseuille flow: $K_i=h^2/12\mu_i$ (2), where h is the gap height and $\mu_i$ is the viscosity of the specific phase. The pressure is continuous respectively along the interior and along the exterior of the undisturbed interface $\eta=ut$. Next a perturbation expansion is used with $p=P+\varepsilon p'$, $u=u+\varepsilon u'$ and $\eta=Ut+\varepsilon\eta'$, where $\varepsilon \ll 1$. The linearization is trivial except at the interface $\Delta p_i=0$ (3), $$p_1' - p_2' = \gamma\frac{\partial 2\eta'}{\partial y2}, \tag{4}$$

$$u' = -K_i = -\frac{h}{12\mu_i}, \tag{5}$$

$$\frac{\partial\eta'}{\partial t} = \overline{u}'e_x. \tag{6}$$

We assume that each wavenumber k is independent and chosen to be real positive in the y direction without any loss of generality. From this the normal mode expansion is $p_i=\hat{p}_i$ $\exp(i(ky-\omega t))$ (7) and $\eta'=C\exp(i(ky-\omega t))$ (8), which is suggested by the invariance of the base flow solution with respect to y. We also impose far field boundary conditions on each fluid: $\hat{p}_1=A_1\exp(kx)$ (9) and $\hat{p}_2=A_2\exp(-kx)$ (10). From this the final dispersion becomes the following:

$$\omega = \frac{\mu1-\mu2}{\mu1+\mu2}uk - \gamma\frac{h^3}{12}\frac{k^3}{\mu1+\mu2}. \tag{11}$$

Figure 3B:
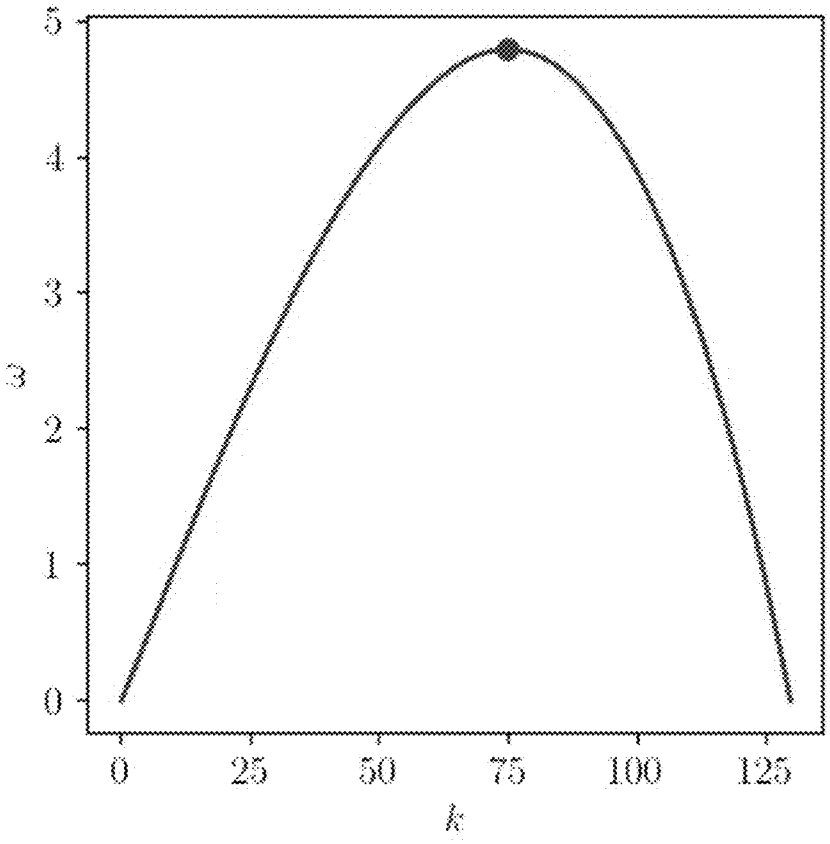
FIGS. 3B and 3C show plots of flow (in)stability analyses, in accordance with some embodiments of the present disclosure.

Graphing (11), we get the plot shown in FIG. 3B. Herein, viscosities for the two fluids are air and water with viscosities of $1\times10^{-3}$ Pa s and $2\times10^{-5}$ Pa s, surface tension of 0.07 N/m, gap height of 1 mm, and fluid interface front velocity of 0.1 m/s. The point at the top of the curve represents the maximum frequency $\omega_c$. The maximum growing critical wavenumber $k_c$ where $\omega(k_c)$ is maximized is at $$k_c = 2/b\sqrt{\frac{(\mu1-\mu2)u}{\gamma}}. \tag{12}$$

Substituting this into the equation for ω we get the maximum frequency $@_c$:

$$\omega_c = 4u/3b\frac{\mu1-\mu2}{\mu1+\mu2}\sqrt{\frac{(\mu1-\mu2)u}{\gamma}}. \tag{13}$$

Since the square root term is a capillary number, we can define the following:

$$Ca = \frac{(\mu1-\mu2)U}{\gamma} \tag{14}$$

Or we could instead write it as such:

$$\omega_c = \frac{4u^{1.5}(\mu_1-\mu_2)^{1.5}}{3h(\mu_1+\mu_2)\gamma^{0.5}}. \tag{15}$$

And so the characteristic time becomes:

$$t_c = 1/\omega_c = 4u/3b\frac{\mu1-\mu2}{\mu1+\mu2}Ca^{-0.5}. \tag{16}$$

Since we want to minimize $\omega_c$ (and thereby minimize the instability by increasing the timescale of the instability onset $t_c$), then we want the following to occur: (1) have velocity u be as small as possible: (2) have viscosities $\mu_1$ and $\mu_2$ be as close to each other as possible: (3) have the gap width h be as large as possible: (4) have the surface tension $\gamma$ be as large as possible: and (5) have the total sum of viscosities $\mu_1+\mu_2$ be as large as possible.

However, the velocity u and the gap height h are not independent, since they are related by the Hagen-Poiseulle equation. At the interface:

$$u = \frac{h^2}{12\mu 1}\nabla P_1 = \frac{h^2}{12\mu 2}\nabla P_2. \tag{17}$$

If we substitute this for u in the equation for $\omega_c$, we get the following:

$$\omega_c = \frac{h\nabla P_1}{18\sqrt{3}\,\mu 1}\frac{\mu 1-\mu 2}{\mu 1+\mu 2}\sqrt{\frac{h^2\nabla P_1(\mu 1-\mu 2)}{\mu 1\gamma}}. \tag{18}$$

The overall dependence on gap width h is $\omega_c$~$h^2$, so for the same pressure gradient driving force, we can restrict instability and make the flow more uniform by having a smaller gap width. The dependence on the pressure gradient $\nabla P$ is $\omega_c$~$\nabla P^{1.5}$, so having a smaller pressure gradient (and hence smaller velocity) should also reduce the onset of the instability.

If we want to compare the instability onset for water and isopropanol, we can apply the conditions shown in Table 1.

TABLE 1

Fluid properties for determining instability onset

| | Viscosity (Pa s) | Surface tension [N/m] |
|---|---|---|
| Water | $1.00 \times 10^{-3}$ | 0.0729 |
| Isopropanol (IPA) | $2.37 \times 10^{-3}$ | 0.0217 |
| Air | $1.80 \times 10^{-3}$ | N.A. |

If we assume that the pressure gradient $\nabla$P1 and flow cell height b are the same for both fluids, then we can calculate the ratio:

$$\frac{\omega_{IPA}}{\omega_{H2O}} = \left(\frac{\mu_{IPA}}{\mu_{H2O}}\right)^{-1.5}\left(\frac{r_{IPA}}{r_{H2O}}\right)^{-0.5}\frac{(\mu_{IPA}-\mu_{air})(\mu_{H2O}+\mu_{air})}{(\mu_{H2O}-\mu_{air})(\mu_{IPA}+\mu_{air})} = 0.513. \tag{19}$$

The ratio of the characteristic times for the instability onset is simply the inverse of this:

$$\frac{t_{IPA}}{t_{H2O}} = \left(\frac{\omega_{IPA}}{\omega_{H2O}}\right)^{-1} = 1.95. \tag{20}$$

So from this we predict that the instability onset for IPA will take almost twice as long as it will for water for the same flow pressure gradient and flow channel height, or that drying IPA with air will be more stable than drying water with air.

We can reason out this result by looking at the individual terms in the equation above.

$$\frac{\mu_{IPA}}{\mu_{H2O}}.$$

is simply the ratio of the viscosity of each liquid, and this term is to the −1.5 power, giving a value for this term alone of 0.274. This term arises from the resistance to flow that the fluid provides when put under the driving force of the pressure gradient $\nabla$P1.

The ratio of the surface tension is self-evident and represents the restoring force that resists the instability onset due to the increase in surface area. This term alone in the equation is equal to 1.83, which is due to the water having a higher surface tension than IPA, and so provides a stronger restoration force.

The third term has to do with the difference in the viscosity of the air and the liquid. Overall this term is equal to 1.02, so it shows that the difference in this specific effect is negligible, since air has a viscosity that two orders of magnitude smaller than either water or isopropanol.

All three terms multiplied together give us the total value of 0.513, showing that for a constant pressure gradient, the larger viscosity of the IPA has a greater effect in reducing instability of the IPA flow than does the larger surface tension of water.

In order to prevent the Saffman-Taylor instability, the parameters in hardware implementation that we can readily control are the inlet gas/air drying pressure p and the gap height h. The difficulty in analyzing the flow is that even with simple laminar (approximated as Darcy) flow between the plates, the moving contact line (e.g. the interface 130) between the two phases means that the volumetric flowrate itself will change as a function of the contact line position, even if the inlet gas flow pressure is constant.

We can analyze it with the following equations. Solving the Navier-Stokes equation in the radial direction gives us the radial velocity as a function of height z, then taking the average velocity gives us $$u = -\frac{h^2}{12\mu}\frac{dp}{dr} \tag{21}$$

However the pressure gradient $$\frac{dp}{dr}$$

is not constant either, as it would be if this were flow in a pipe, etc. To find the pressure p as a function of radial position r we then use the continuity equations:

$$\frac{d(ru)}{dr} = 0,\ \frac{d}{dr}\left(-\frac{h^2 r}{12\mu}\frac{dp}{dr}\right) = 0, \text{ and } \frac{d}{dr}\left(r\frac{dp}{dr}\right) == 0. \tag{22}$$

We can then use this to solve for the pressure in the air and in the liquid phases. We will define the following: the air inlet pressure is $p_0$ at radius $R_0$, the air pressure at the interface is $p_1$, the liquid pressure at the interface is $p_2$, and the outlet pressure is $p_3$ at radius $R_1$. Without loss of generality, we define the outlet pressure to be $p_3$=0. Solving for the pressure in each phase, we now define r to be the specific radial location of the air/liquid interface, and $\xi$ to the the radial location in each phase: $R_0 \le \xi \le r$ for the air phase, and $r \le \xi \le R_1$ for the liquid phase. The pressure in each phase is the following:

$$p(\xi) = (p_0 - p_1)\frac{\ln(\xi/R_0)}{\ln(r/R_0)} \text{ and } \tag{23}$$

$$p(\xi) = p_2\left(1 + \frac{\ln(\xi/r)}{\ln(R_1/r)}\right). \tag{24}$$

From the continuity equation we know that $Q=2\pi rhu$ must be the same for both phases. Now that we have a full equation for the pressure in each phase we can use equation (21) to solve for the velocity and volumetric flow rate in each phase, setting them equal to each other:

$$Q = \frac{\pi h^3(p_0 - p_1)}{6\mu_1(\ln r - \ln R_0)} = \frac{\pi h^3(p_2 - 0)}{6\mu_2(\ln R_1 - \ln r)}. \tag{25}$$

Simplifying this we then get the following: $(p_0-p_1)/(\mu_1 \ln(r/R_0))=p_2/(\mu_2 \ln(R_1/r))$ (26). We then substitute the capillary pressure to get $p_2$ in terms of $p_1$:

$$p_2 = p_1 - \frac{\gamma}{h}(\cos\theta_1 + \cos\theta_2) = p_1 - \frac{\gamma^*}{h}, \tag{27}$$

where $\theta_1$ and $\theta_2$ are the top and bottom contact angles, and $\gamma^*$ is the lumped parameter for the surface tension with contact angle effects. We then substitute this into equation (26) to get $p_1$ as a function of $p_0$ and contact line position r:

$$p_1 = \left(p_0\ \mu_2\ln(R_1/r) + \frac{\gamma^*}{h}\mu_1\ln(r/R_0)\right)/(\mu_1\ln(r/R_0) + \mu_2\ln(R_1/r)). \tag{28}$$

We then can start again with equation (21) and calculate the flow velocity at the interface r: $u=h^2(p_0-p_1)/(12r\mu_1 \ln(r/R_0))$ (29). We can then substitute equation (28) into equation (29) for $p_1$ to obtain a general relationship between the contact line velocity u, the contact line position r, and the inlet pressure $p_0$:

$$p_0h^2 = \gamma * h + 12ru\left(\mu_1 \ln\left(\frac{r}{R_0}\right) + \mu_2 \ln\left(\frac{R_1}{r}\right)\right). \tag{30}$$

Figure 3C:
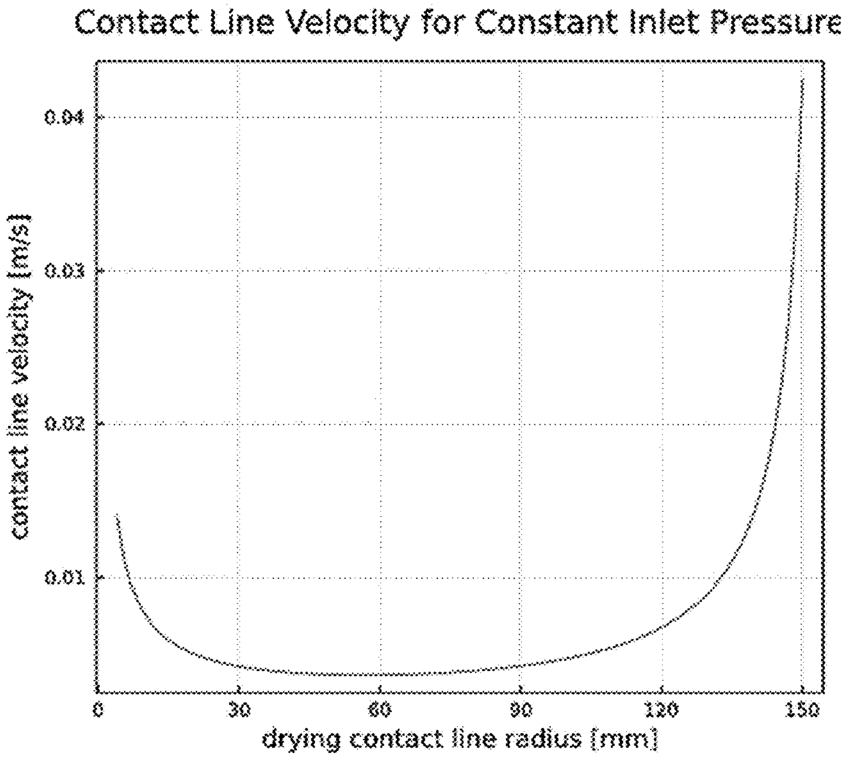

Assuming a constant inlet pressure, i.e. $p_0$ is constant, from equation (29) we can obtain the plot in FIG. 3C. As shown, even when the inlet air pressure for drying is constant, the drying contact line velocity is not constant. Additionally, instability is more likely to occur when the velocity is higher, e.g. close to beginning or the end.

Referring back to equation (15)

$$\omega_c = \frac{4u^{1.5}(\mu_1 - \mu_2)^{1.5}}{3h(\mu_1 + \mu_2)\gamma^{0.5}},$$

parameters affecting stability include an inlet flow pressure $p_0$ (also referred to as $p_{in}$), a channel height h (also referred to as a distance or gap height), a viscosity sum $\mu_1+\mu_2$, a viscosity difference $\mu_2-\mu_1$ and a liquid surface tension $\gamma$. Specifically, the higher the inlet flow pressure $p_{in}$, the less stable. The higher the channel height h, the less stable. The higher the viscosity sum $\mu_1+\mu_2$, the more stable. The higher viscosity difference $\mu_2-\mu_1$, the less stable. The higher the liquid surface tension $\gamma$, the more stable.

We can easily improve stability by reducing the drying air flow inlet pressure $p_{in}$ and height h, but that would greatly increase drying time. The object of the present disclosure is to make drying as fast as possible so that the drying process is competitive with the standard single wafer process. Techniques herein can improve flow stability by controlling the gap height h and/or the inlet pressure $P_{in}$. Note that h and $P_{in}$ are not independent but controlled by flow dynamics and instability growth rate.

Equations (30) and (15) can be respectively re-written as follows:

$$p_{in}(r) = \frac{12ru}{h^2}\left(\mu_1 \ln\left(\frac{\gamma}{R_{in}}\right) + \mu_2 \ln\left(\frac{R_{out}}{r}\right)\right) + \frac{\gamma}{h}, \text{ and} \tag{31}$$

$$u = \left(\frac{3h\omega(\mu_2 + \mu_1)}{4}\right)^{2/3}\frac{\gamma^{1/3}}{\mu_2 - \mu_1}. \tag{32}$$

Herein, $p_{in}(r)$ is an inlet flow pressure of a dispense nozzle (e.g. 153) and can also be referred to as $P_{in}$. r is an average radius of an interface or a contact line (e.g. 130), an average contact line radial position or a drying contact line radius. u is an average velocity of the interface (e.g. 130). h is the aforementioned distance, gap height, channel height or plate height. $\mu_1$ is a viscosity of a drying gas (e.g. air). $\mu_2$ is a viscosity of a liquid (e.g. IPA). $R_{in}$ is a radius of an inlet of an injection hole (e.g. 153). $R_{out}$ is a radius of a wafer (e.g. 140). $\gamma$ is a surface tension of the liquid (e.g. IPA). $\omega$ is an instability growth rate.

Equations (31) and (32) can then be combined to obtain a final relationship between the gap height h and the inlet pressure $p_{in}(r)$ for a desired constant instability growth rate $\omega_c$.

Figure 4:
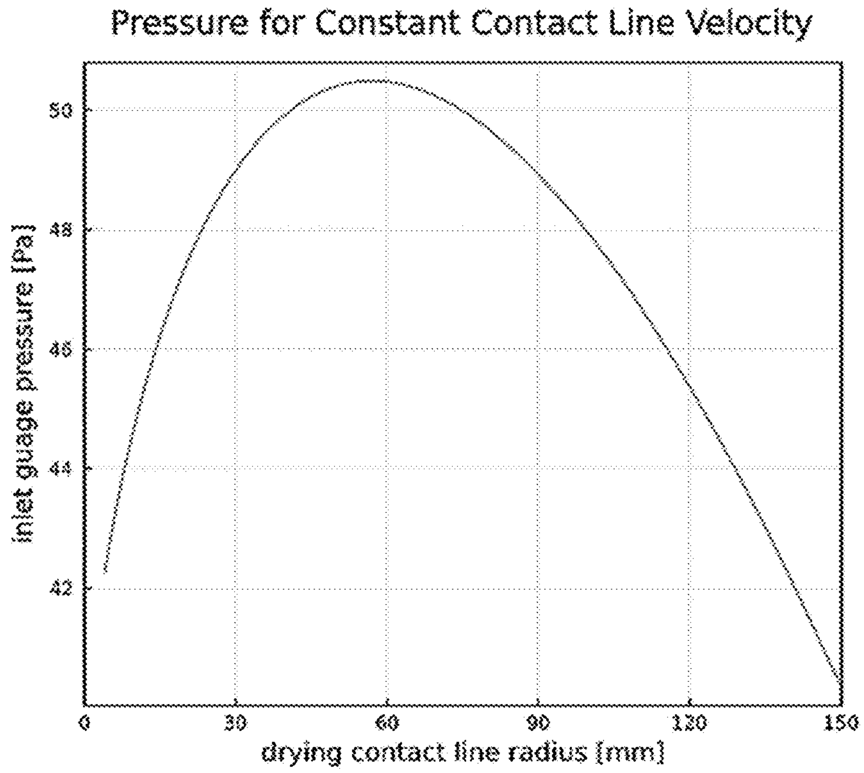
FIGS. 4 and 5 show plots of flow (in)stability analyses, in accordance with some embodiments of the present disclosure.

In one embodiment, we can solve for $P_{in}(r)$. We obtain the required inlet pressure $p_{in}(r)$ as a function of the contact line radial position r with a constant plate height h and velocity u such that the instability growth rate $\omega_c$ remains constant. FIG. 4 shows a plot of the inlet pressure, $p_{in}(r)$ versus the drying contact line radius, r. When the plate height, h is kept constant and the inlet pressure, $p_{in}(r)$ is adjusted based on the drying contact line radius, r according to FIG. 4, the contact line velocity u can be kept constant to maintain a stable flow.

Table 2 below shows values of parameters used in FIG. 4. These values are shown only for illustrative purposes and are not limiting.

TABLE 2

Representative Parameter Values

| Symbol | Value | Meaning |
|---|---|---|
| U | 0.01 m/s | velocity of contact line |
| $\mu_1$ | $1.8 \times 10^{-5}$ Pa s | viscosity of air |
| $\mu_2$ | $2.0 \times 10^{-3}$ Pa s | viscosity of IPA |
| $R_{in}$ | 4.0 mm | inlet radius |
| $R_{out}$ | 150 mm | outer wafer radius |
| Γ | 0.02 N/m | IPA surface tension |
| H | 1.0 mm | gap height |
| Ω | 0.3 Hz | instability growth rate |

In another embodiment, we can also solve equations (31) and (32) for the variable plate height h as a function of contact line position r for a constant inlet pressure, $p_{in}(r)$. In this case, h may need to be solved for numerically. That is, for any given radius r, solve for h such that:

$$p_{in}h^2 - \gamma h - 12ru\left(\mu_1 \ln\left(\frac{\gamma}{R_{in}}\right) + \mu_2 \ln\left(\frac{R_{out}}{\gamma}\right)\right) = 0, \text{ and}$$

$$u = \left(\frac{3h\omega(\mu_2 + \mu_1)}{4}\right)^{2/3} \frac{\gamma^{1/3}}{\mu_2 - \mu_1}.$$

Figure 5:
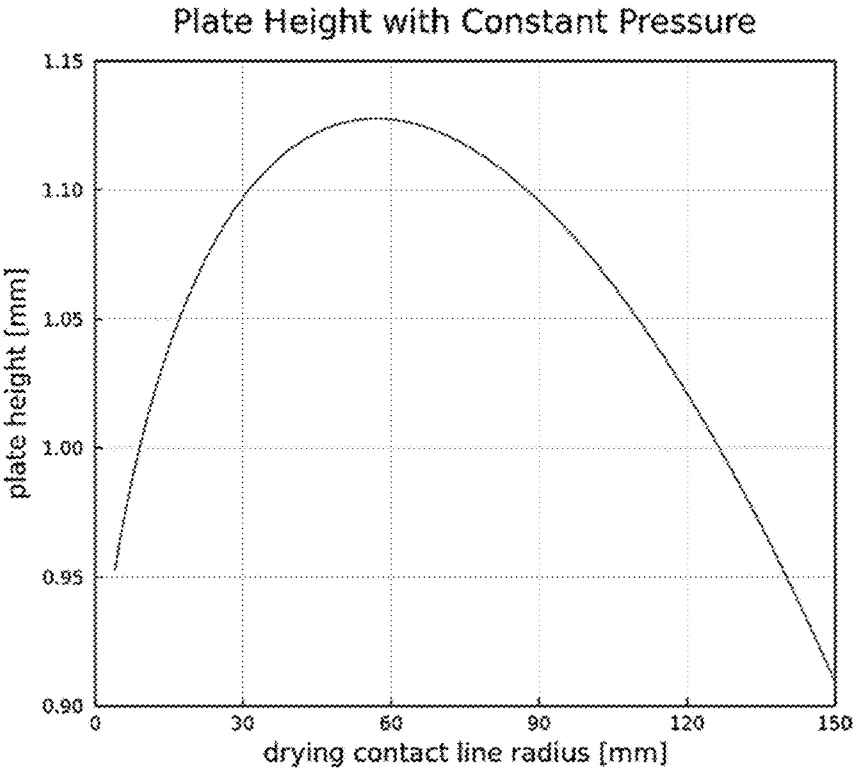

FIG. 5 shows a plot of the plate height, h versus the drying contact line radius, r. When the inlet pressure, $p_{in}(r)$ is kept constant and the plate height, h is adjusted based on the drying contact line radius, r according to FIG. 5, the contact line velocity u can be kept constant to maintain a stable flow.

Table 3 below shows values of parameters used in FIG. 5. These values are shown only for illustrative purposes and are not limiting.

TABLE 3

Representative Parameter Values

| Symbol | Value | Meaning |
|---|---|---|
| $P_{in}$ | 44.4 Pa | inlet air gauge pressure |
| $\mu_1$ | $1.8 \times 10^{-5}$ Pa s | viscosity of air |
| $\mu_2$ | $2.0 \times 10^{-3}$ Pa s | viscosity of IPA |
| $R_{in}$ | 4.0 mm | inlet radius |
| $R_{out}$ | 150 mm | outer wafer radius |
| $\gamma$ | 0.02 N/m | IPA surface tension |
| $\omega$ | 0.3 Hz | instability growth rate |

Figure 6:
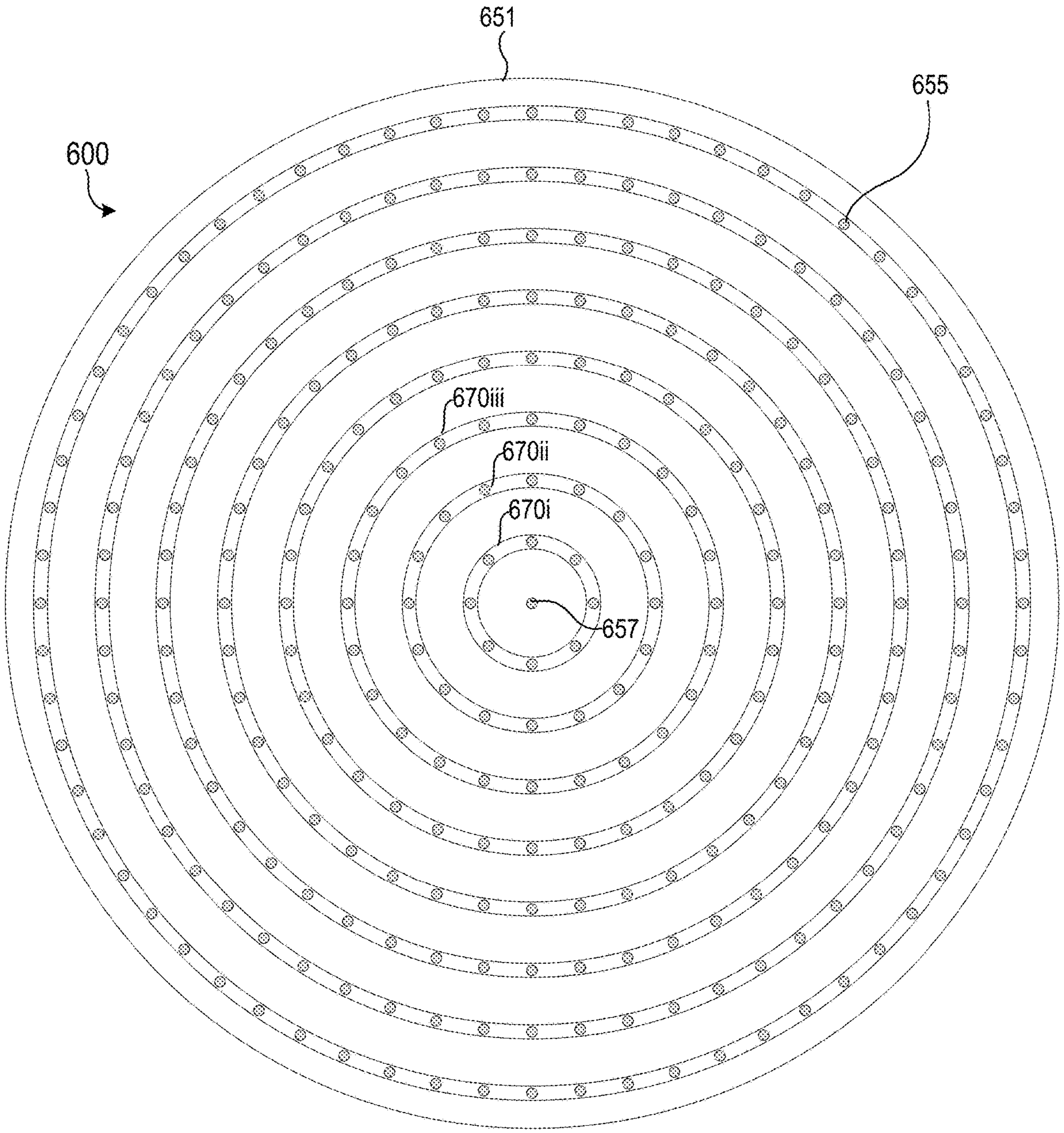
FIG. 6 shows a top-down view of a dispense system, in accordance with one embodiment of the present disclosure.

FIG. 6 shows a top-down view of a dispense system 600, in accordance with one embodiment of the present disclosure. As shown, the dispense system 600 includes a plate 651 and a plurality of injection holes 655. The plurality of injection holes 655 can include a central injection hole 657 and rows of injection holes arranged in a concentric ring pattern, e.g. a first radial row 670*i* of injection holes around the central injection hole 657, a second radial row 670*ii* of injection holes around the first radial row 670*i* of injection holes, a third row 670*iii* of injection holes around the second radial row 670*ii* of injection holes, and the like.

During operation, while injecting the drying gas 120 onto the wafer 140 via the dispense system 600, an injection sequence can be executed. For example, the drying gas 120 can first be injected onto the wafer 140 via the central injection hole 657. After the interface 130 moves past the first radial row 670*i*, the drying gas 120 can be injected via the first radial row 670*i* of injection holes rather than the central injection hole 657. After the interface 130 moves past the second radial row 670*ii*, the drying gas 120 can be injected via the second radial row 670*ii* of injection holes, instead of the first radial row 670*i* of injection holes. Such a process can continue for the remaining radial rows of injection holes until the wafer 140 is fully dry.

That is, instead of only injecting air onto the center of the wafer 140, the dispense system 600 allows for transitioning to inject air at sequentially larger radii so that the injected air is right next to a moving contact line or moving interface (e.g. 130). Additionally, the dispense system 600 can include control/switching hardware to switch air flow from the central injection hole 657 to the first radial row 670*i* and from one radial row to another.

As should be understood, the dispense system 600 can include any number of radial rows with any suitable spacing between neighboring radial rows and any number of injection holes in a particular radial row, depending on specific design needs.

Figure 7:
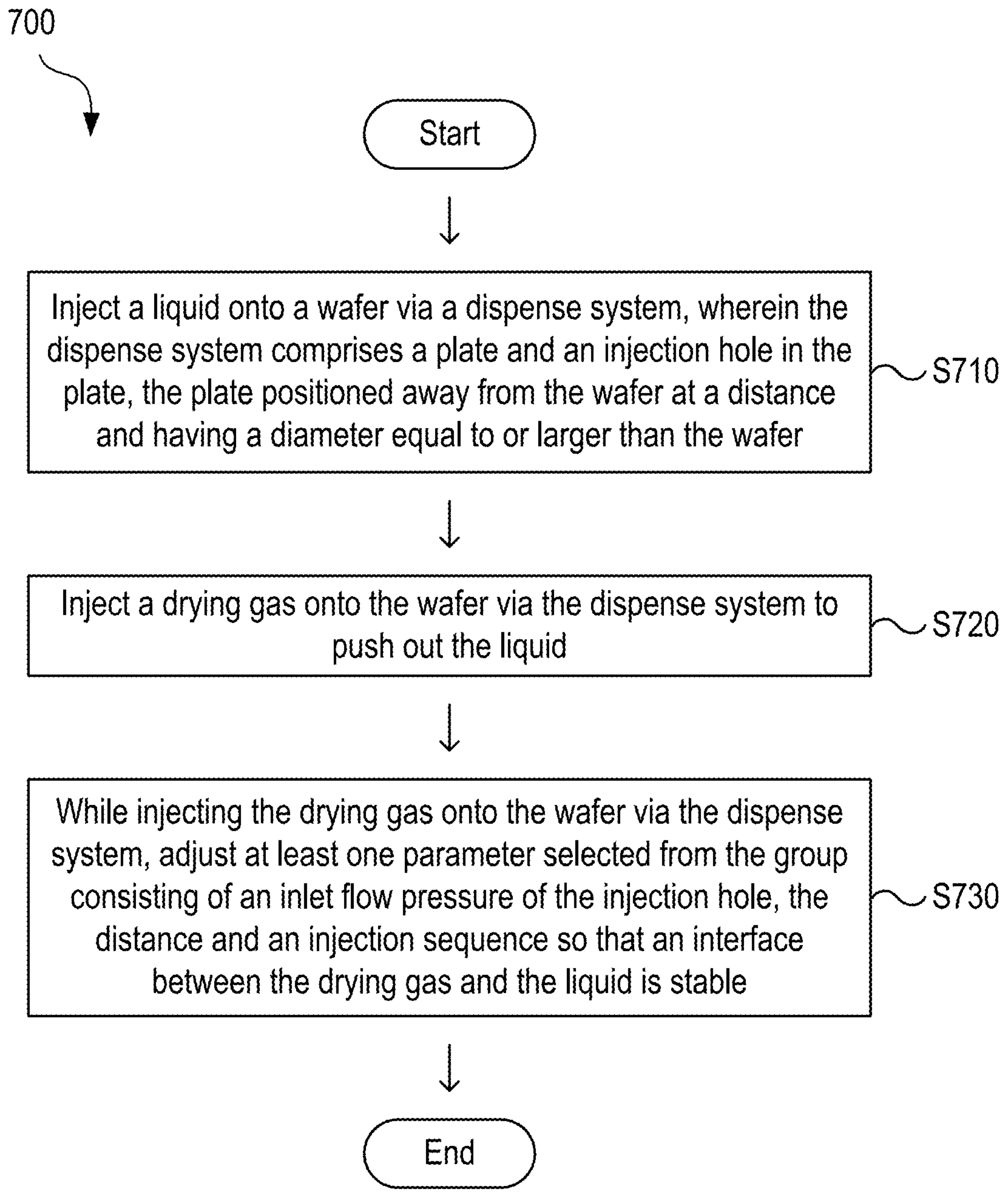
FIG. 7 shows a flow chart of a process for flow control, in accordance with one embodiment of the present disclosure.

FIG. 7 shows a flow chart of a process 700 for flow control, in accordance with some embodiments of the present disclosure. The process 700 begins with Step S710 by injecting a liquid onto a wafer via a dispense system. The dispense system includes a plate and an injection hole in the plate. The plate is positioned away from the wafer at a distance and has a diameter equal to or larger than the wafer. At Step S720, a drying gas is injected onto the wafer via the dispense system to push out the liquid. At Step S730, while injecting the drying gas onto the wafer via the dispense system, at least one parameter selected from the group consisting of an inlet flow pressure of the injection hole, the distance and an injection sequence is adjusted so that an interface between the drying gas and the liquid is stable.

Note that techniques shown in FIGS. 4 and 5 can be combined to achieve flow stability. For example, while injecting the drying gas 120 onto the wafer 140 via the dispense system 150, the distance h and the inlet flow pressure $P_{in}$ can be adjusted simultaneously or sequentially. In one embodiment, the distance h is changing as a known function of time e.g. $h=kt+h_0$, where k is a known constant, t is time, and $h_0$ is an initial distance, equations (31) and (32) can be solved analytically or numerically for the inlet flow pressure $P_{in}$. In another embodiment, the inlet flow pressure $P_{in}$ is changing as a known function of time e.g. $P_{in}=st+P_{in,0}$, where s is a known constant, t is time, and $P_{in,0}$ is an initial inlet flow pressure, equations (31) and (32) can be solved analytically or numerically for the distance h. In yet another embodiment, the distance h is kept constant, and the inlet flow pressure $P_{in}$ is adjusted according to FIG. 4 for a first stage, e.g. from r=0 to r=90 mm. Then, the inlet flow pressure $P_{in}$ is kept constant, and the distance is adjusted according to FIG. 5 for a second stage, e.g. from r=90 mm to r=150 mm.

Moreover, techniques shown in FIGS. 4, 5 and 6 can be combined to achieve flow stability. For instance, while adjusting the injection sequence for the dispense system 600, at least one of the distance h or the inlet flow pressure $P_{in}$ can be adjusted. In one embodiment, the injection sequence and the distance h are adjusted while the inlet flow pressure $P_{in}$ is kept constant. In another embodiment, the injection sequence and the inlet flow pressure $P_{in}$ are adjusted while the distance h is kept constant. In yet another embodiment, the injection sequence, the distance h and the inlet flow pressure $P_{in}$ are adjusted simultaneously or sequentially.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "wafer" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a layer on or overlying a base substrate structure such as a thin film. Thus, substrate is not limited to any particular base structure, underlying layer or overlying layer, patterned or un-patterned, but rather, is contemplated to include any such layer or base structure, and any combination of layers and/or base structures. The description may reference particular types of substrates, but this is for illustrative purposes only.

The substrate can be any suitable substrate, such as a silicon (Si) substrate, a germanium (Ge) substrate, a silicon-germanium (SiGe) substrate, and/or a silicon-on-insulator (SOI) substrate. The substrate may include a semiconductor material, for example, a Group IV semiconductor, a Group III-V compound semiconductor, or a Group II-VI oxide semiconductor. The Group IV semiconductor may include Si, Ge, or SiGe. The substrate may be a bulk wafer or an epitaxial layer. The substrate may alternatively be a glass substrate or a quartz substrate, in a standard wafer shape or as a flat panel.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. A method of flow control, the method comprising:

injecting a liquid onto a wafer via a dispense system, wherein the dispense system comprises a plate and an injection hole in the plate, and the plate is positioned away from the wafer at a distance and has a diameter equal to or larger than the wafer;

injecting a drying gas onto the wafer via the dispense system to push out the liquid; and while injecting the drying gas onto the wafer via the dispense system, adjusting at least one parameter selected from the group consisting of an inlet flow pressure of the injection hole, the distance and an injection sequence of the drying gas so that an interface between the drying gas and the liquid is substantially circular, wherein:

the inlet flow pressure is adjusted based on equations, $$p_{in}(r) = \frac{12ru}{h^2}\left(\mu_1 \ln\left(\frac{\gamma}{R_{in}}\right) + \mu_2 \ln\left(\frac{R_{out}}{r}\right)\right) + \frac{\gamma}{h}, \text{ and}$$

-continued $$u = \left(\frac{3h\omega(\mu_2+\mu_1)}{4}\right)^{2/3} \frac{\gamma^{1/3}}{\mu_2-\mu_1},$$

where $p_{in}(r)$ is the inlet flow pressure, r is an average radius of the interface, u is an average velocity of the interface, h is the distance, $\mu_1$ is a viscosity of the drying gas, $\mu_2$ is a viscosity of the liquid, $R_{in}$ is a radius of an inlet of the injection hole, $R_{out}$ is a radius of the wafer, $\gamma$ is a surface tension of the liquid, and $\omega$ is an instability growth rate.

2. The method of claim 1, further comprising:

while injecting the drying gas onto the wafer via the dispense system, keeping the distance constant and adjusting the inlet flow pressure.

3. The method of claim 1, further comprising:

while injecting the drying gas onto the wafer via the dispense system, keeping the inlet flow pressure constant and adjusting the distance.

4. The method of claim 1, wherein:

the dispense system comprises a plate and a plurality of injection holes, and the plurality of injection holes comprises a central injection hole, a first radial row of injection holes around the central injection hole, and a second radial row of injection holes around the first radial row of injection holes.

5. The method of claim 1, further comprising:

while injecting the drying gas onto the wafer via the dispense system, adjusting the distance and the inlet flow pressure simultaneously or sequentially.

6. The method of claim 1, wherein the interface is moving at a substantially constant velocity.

7. The method of claim 1, wherein the drying gas comprises air.

8. The method of claim 1, wherein the liquid comprises isopropyl alcohol.

9. The method of claim 1, wherein the injection hole is in a center of the plate, and the plate has the diameter equal to the wafer.

10. The method of claim 1, wherein the plate is substantially flat or conical.

11. The method of claim 1, wherein the drying gas is injected onto the wafer via the dispense system from one or two sides of the wafer.

12. The method of claim 1, further comprising keeping the wafer from rotating while injecting the drying gas onto the wafer.

13. The method of claim 2, wherein:

the inlet flow pressure is adjusted based on a position of the interface.

14. The method of claim 3, wherein:

the inlet flow pressure is adjusted based on a position of the interface.

15. The method of claim 4, further comprising, while injecting the drying gas onto the wafer via the dispense system, adjusting the injection sequence by:

injecting the drying gas onto the wafer via the central injection hole;

after the interface moves past the first radial row, injecting the drying gas via the first radial row of injection holes; and after the interface moves past the second radial row, injecting the drying gas via the second radial row of injection holes.

16. The method of claim 4, wherein:

the central injection hole, the first radial row and the second radial row are concentric.

17. The method of claim 14, further comprising, wherein:

the inlet flow pressure is adjusted based on equations, $$p_{in}h^2 - \gamma h - 12ru\left(\mu_1 \ln\left(\frac{\gamma}{R_{in}}\right) + \mu_2 \ln\left(\frac{R_{out}}{r}\right)\right) = 0, \text{ and}$$

$$u = \left(\frac{3h\omega(\mu_2 + \mu_1)}{4}\right)^{2/3} \frac{\gamma^{1/3}}{\mu_2 - \mu_1},$$

where $p_{in}$ is the inlet flow pressure, r is an average radius of the interface, u is an average velocity of the interface, h is the distance, $\mu_1$ is a viscosity of the drying gas, $\mu_2$ is a viscosity of the liquid, $R_{in}$ is a radius of an inlet of the injection hole, $R_{out}$ is a radius of the wafer, $\gamma$ is a surface tension of the liquid, and $\omega$ is an instability growth rate.

18. The method of claim 15, further comprising:

while adjusting the injection sequence, adjusting at least one of the distance or the inlet flow pressure.

* * * * *